United States Patent [19]

Fischer

[11] Patent Number: 4,829,251

[45] Date of Patent: * May 9, 1989

[54] ELECTROMAGNETIC PROBE FOR MEASURING THE THICKNESS OF THIN COATINGS ON MAGNETIC SUBSTRATES

[76] Inventor: Helmut Fischer, Industriestrasse 21, 7032 Sindelfingen-Maichingen, Fed. Rep. of Germany

[*] Notice: The portion of the term of this patent subsequent to Oct. 21, 2003 has been disclaimed.

[21] Appl. No.: 528,273

[22] Filed: Aug. 31, 1983

[51] Int. Cl.[4] .................. G01B 7/10; G01R 33/12
[52] U.S. Cl. .................. 324/230; 324/262
[58] Field of Search .................. 324/229–231, 324/262, 225

[56] References Cited

U.S. PATENT DOCUMENTS

| 2,751,552 | 6/1956 | Brenner et al. | 324/230 |
| 2,933,677 | 4/1960 | Lieber | 324/230 |
| 3,626,344 | 12/1971 | Shaternikou et al. | 324/230 X |
| 3,761,804 | 9/1973 | Sterngroever | 324/230 |
| 3,999,120 | 12/1976 | Streng | 324/230 X |
| 4,005,360 | 1/1977 | Ott | 324/230 |
| 4,041,378 | 8/1977 | Ott | 324/262 |
| 4,204,159 | 5/1980 | Sariah et al. | 324/232 |
| 4,507,609 | 3/1985 | Madewell | 324/230 |
| 4,618,825 | 10/1986 | Fischer | 324/230 |

FOREIGN PATENT DOCUMENTS

| 1009400 | 5/1957 | Fed. Rep. of Germany | 324/229 |
| 0100330 | 6/1982 | Japan | 324/219 |
| 47438 | 9/1963 | Poland | 324/229 |

Primary Examiner—Richard J. Eisenzopf
Assistant Examiner—Warren S. Edmonds

[57] ABSTRACT

An electromagnetic measuring probe has a pole-piece composed of a magnetic material of high magnetic permeability. The pole-piece has a front face. A recess is machined into the front face and extends into the pole-piece. A pin is positioned within said recess. The pin is composed of hard metal which has a low magnetic permeability in comparison to the material of the pole-piece. The pin has an external front face which comprises the crowned contact surface of the measuring probe.

12 Claims, 4 Drawing Sheets

ELECTROMAGNETIC PROBE FOR MEASURING THE THICKNESS OF THIN COATINGS ON MAGNETIC SUBSTRATES

The present invention relates to an electromagnetic measuring probe with at least one pole-piece composed of a magnetic material of high magnetic permeability having a pole-piece front face, a recess machined into the pole-piece front face extending into the body of the pole-piece front face extending into the body of the pole-piece, a pin composed of another material positioned within the recess, and a ball-like contact surface.

An electromagnetic measuring probe of this type has been described in German Patent Disclosure No. 25 56 340. German Utility Patent No. 72 43 915 as well as German Utility Patent No. 73 36 864 also describe such an apparatus.

BACKGROUND OF THE INVENTION

The said electromagnetic measuring probe allows the thickness of non-magnetic coatings or plating on magnetic substrate materials to be measured, for instance, a coat of paint on an iron or steel part.

All these measuring probes have an exciter winding which is connected to a constant alternating-current supply. Furthermore, there is an induction winding which generates a voltage U. The voltage in the induction winding is a measure of the thickness of the non-magnetic coating or plating.

This type of thickness measurement for thin coatings or platings should at least provide linearity of readout, i.e., a pointer should, for example, deflect twice as far for a coating or plating of double a certain thickness than it does for the said thickness alone.

It is highly desirable that thin coatings be measured without any influence from the substrate material on the characteristics curve. In this case, thin coatings are considered to be those which generate voltages lying within 0 to $\frac{1}{3}$ of the normalized voltage, as defined later in the text.

It is, of course, a well known fact that the relationships between the generated voltage and the coating thickness are not linear for thin coatings or platings. It is, however, exactly in this range where linear measurements are most desirable. From the practical point of view, however, the range from 0 to roughly speaking, 50 micrometers is interesting as a lower range for coating and plating thicknesses.

Obviously, all these instruments must have facilities for switching ranges. If, for example, thicknesses up to 1000 micrometers are to be measured, and the said thickness is chosen as the upper end-scale value, then a thickness of 10 micrometers will be practically impossible to read.

Since it is impossible to avoid switching measuring ranges, then it is highly desirable that the said voltage is a linear function of coating or plating thickness not only at the lower end of the range, but also retains this same linearity to the highest possible thickness values, thus avoiding the necessity of using a different linear function in the upper ranges.

It must also be possible, of course, to make linear measurements in the lower range from 0 to 50 micrometers even when the probe is not handled with any particular care.

The conditions of measurement may change neither during a demonstration at a trade fair, nor over the long term in a harsh industrial environment. In the lower range in particular, the geometry of the crowned contact surface is an important factor. In accordance with Germany Utility Patent No. 73 36 864 an attempt was made to make the ball-like contact surface wear-resistant by depositing a titanium carbide coating onto it, i.e., to contrive that the geometry did not change. The coating, however, is very hard. It is deposited on a relatively soft material. If the thickness of the coating lies between 3 and 15 micrometers, it is possible that the titanium carbide coating will rupture when the probe is set down hard, because the substrate material underneath deforms.

It is also not very easy to deposit a uniformly thick coating on the substrate. If the coating is not uniformly thick, then different measured values are obtained depending on whether the probe is set down exactly at the centre of the ball-like contact surface or at another position. This realistic numerical example illustrates another problem associated with the measurement of thin coatings which, as yet, has no completely satisfactory solution.

A third problem must also be considered: The same probe must also be able to measure coatings on both flat surfaces and curved surfaces of small radius of curvature. An example of the latter is, e.g., a small nail, a small spring or similar.

OBJECTIVES AND STATEMENT OF THE INVENTION

The object of the invention is to indicate a measuring probe of the type specified in the introduction, which allows linear measurements to be made, particularly in the range of thin coatings, while at the same time avoiding non-linearity problems which stem from the magnetization curve as well as the geometry of the ball-like contact surface. This object is also to be fulfilled for the measurement of small parts.

This object is achieved, according to the invention wherein the pin in the pole-piece recess is composed of hard metal which has a low magnetic permeability in comparison to the material of the pole-piece, and the external front face of the pin comprises the ball-like contact surface.

Surprisingly enough, the said configuration brings with it not only the aforementioned linearization, it also has the result that the characteristic curves for very hard-magnetic and very soft-magnetic materials are practically identical. For example, the characteristic curve for hardened steel is practically the same as that for soft iron over the entire measuring range.

Advantageously, the invention includes the following additional features:

The pin is circular cylindrical. This feature allows a more uniform magnetic flux density. Moreover, commercially available pins designed for other purposes can be used. Finally, despite the close tolerances of the pin, it can be manufactured inexpensively.

The pole-piece is circular cylindrical. This feature allows not only the pole-piece to be inexpensively manufactured to very close tolerances, but also allows the recess to be precisely machined at the correct coaxial position.

The pin is composed of sintered hard metal. This feature allows the continued use of weakly magnetizable hard metal, but contrary to the case of non-sintered hard metals, allows Vicker's Hardnesses of 1000 to 2000 to be attained.

The sintered hard metal is titanium carbide with a cobalt content of 2 to 20% by volume. Alternatively, the sintered hard metal is tungsten carbide with a cobalt content of 2 to 20% by volume.

The dimension of the pin in a direction transverse to the longitudinal axis of the pole-piece is $\frac{1}{4}$ to $\frac{2}{3}$ of the dimension of the pole-piece. The pin is several millimeters long and has a diameter of one millimeter or less. The pin diameter is 0.7 mm±50% and the pole-piece is 1.6 mm±50% in the case of a single-pole measuring probe. The ball-like contact surface is a spherical-segment surface, whereby the radius of the spherical segment is from 0.6 to 3 times the diameter of the pole-piece. By these features the linearizaiton can be optimized with respect to the measurement of curved parts and parts with small surface areas.

The apparatus according to the invention can also be used as a single-pole probe. It is not restricted to use as a two-pole probe. If it is to be used as a single-pole probe however, the additional problem of the stray magnetic field arises. This problem can be eliminated in accordance with the following features:

The pole-piece is positioned centrally in a pot core, its front face standing proud of the front face of the pot core wall and the inside wall of the pot core wall is clad with a foil composed of a material with a high magnetic permeability.

DESCRIPTION OF THE DRAWINGS

The invention is now described using preferred illustrative embodiments. The drawings show.

DETAILED DESCRIPTION

Figure 1:
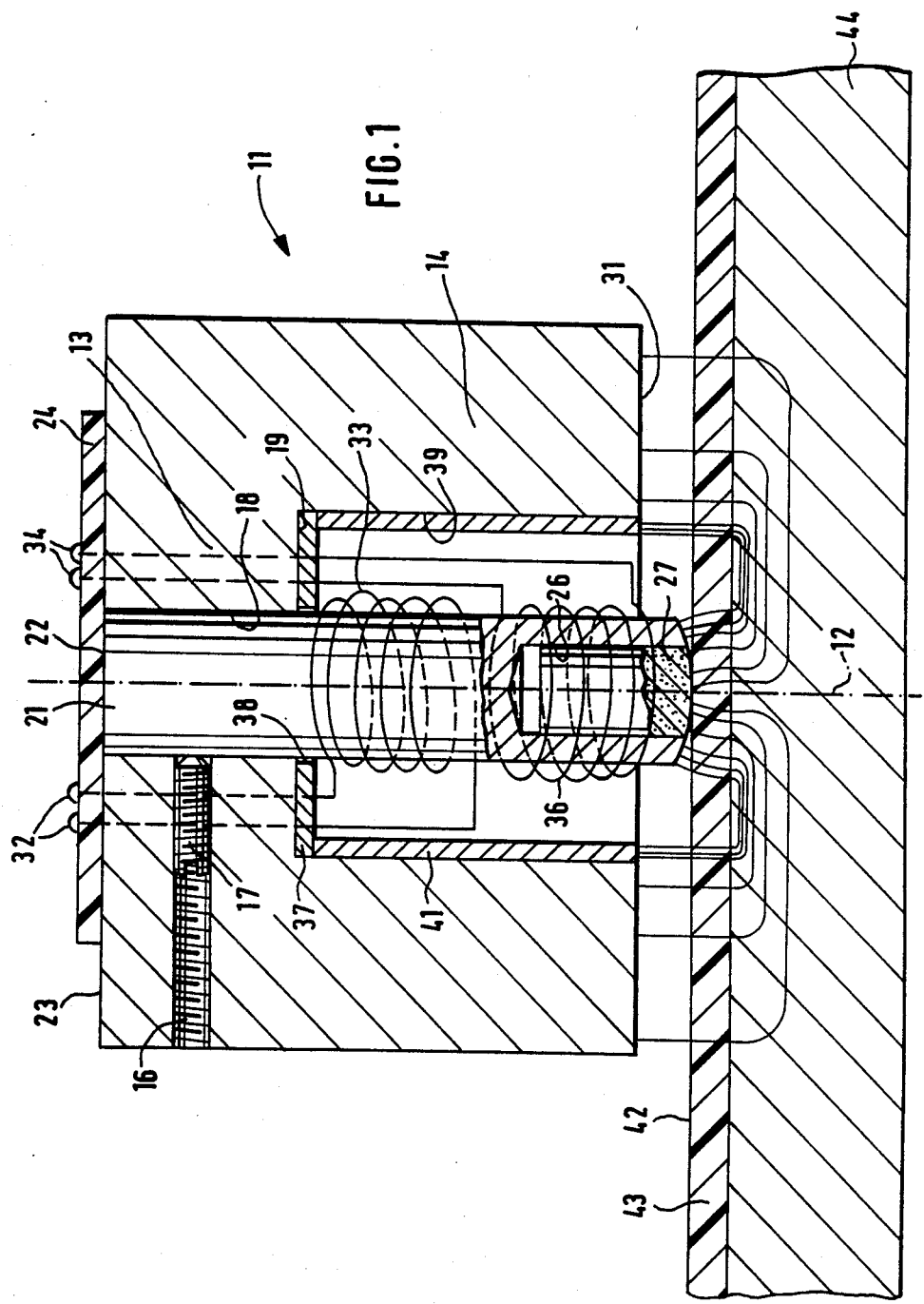
FIG. 1: the substantially enlarged cross-section through a probe which has been set down on a coating or plating.

Referring to FIG. 1, a pot core 11 composed of soft iron is rotationally symmetric about the geometrical longitudinal axis 12. It has a base 13 and a circular cylindrical wall 14. In the area of the base 13 this is a horizontal threaded through-bore 16. A grubscrew 17 is screwed into this bore. The base 13 has a through-bore 18 coaxial to the geometrical longitudinal axis 12 which has a diameter substantially smaller than that of the inner base surface 19 of the base 13. A circular cylindrical core 21 composed of high-permeability material is positioned in the upper section of the through-bore 18 as per FIG. 1. Its top face 22 is lined up with the top face 23 of the base 13. A plastic disc 24, which limits the depth to which the core 21 can be pushed into the through-bore and acts as a stop, etc., is seated on the top face 22 as well as part of the top face 23. The core 21 is clamped into this position by screwing in the grubscrew 7. In the lower section of the core 21 as per FIG. 1 is a, coaxial blind hole. In this hole is positioned a sintered hard-metal pin which is fixed in the axial direction. The pin is held in position either by a clamping device or by adhesive.

Figure 2:
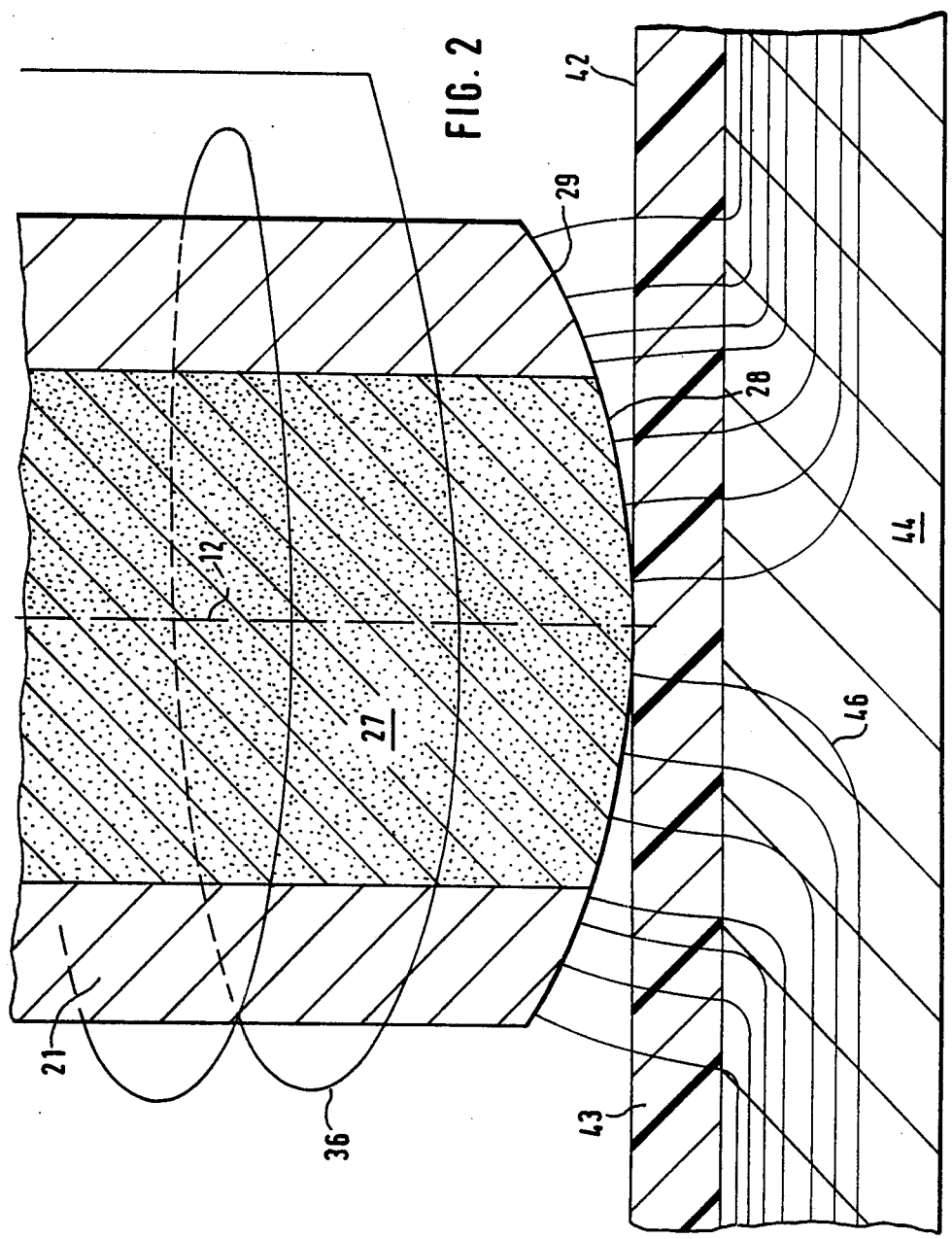
FIG. 2: the area around the contact surface, enlarged further in order to show better the direction of the magnetic field flux lines.

Referring to FIG. 2, the bottom face 28 of the pin 27 is ground as a spherical cup. It is symmetrical about the longituduial axis 12. The geometry of the bottom face 28 is continued into the bottom face 29 of the core 21. The bottom face 28, 29 is produced by using a technique similar to that used in the optics industry for grinding convex lenses or for the manufacture of watch bezels. The bottom face 28 is therefore of polished quality.

It can be seen from FIGS. 1 and 2 that the bottom face 31 of the wall 14 is higher than the highest point of the bottom face 29. The bottom face 28 is the actual contact surface.

The plastic disc 24 carries two terminals 32. These are connected the a constant alternating current supply. The supply has a frequency of 25 Hz to 5kHz. The frequency cannot be changed, it is in fact permanently set. The applied alternating current is constant at about 3mA. An exciter winding 33 is supplied from the terminals 32. This winding is seated on the core 21.

The plastic disc 24 carries two further terminals 34. These are connected to an induction winding which is also seated on the core 21. In the illustrative embodiment the induction winding 36 is wound around the core 21 in the region of the pin 27, whereas the exciter winding 33 is wound about that region of the core 21 which does not have the blind hole 26.

The base surface 19 is covered with a coaxial circular disc 37 composed of high-permeability foil material which has a thickness of roughly 20 to 40 micrometers. The disc 37 has a circular hole 38 lined up with the through-bore 18, the edge of which is positioned on the circular cylindrical external surface of the core 21.

The inner surface 39 of the wall 14 is also lined with a cylinder 41 of the said foil. The top of this cylinder touches the disc 37. The bottom front face 41 is in line with the radial bottom face 31.

The core 21 stands perpendicular to the surface 42 of a coating 43, that has a thickness which is to be measured, that is non-magnetic and that has been deposited on a magnetisable substrate 44.

As can be seen in FIG. 2, when in use, the lines of force 46 must be prevented from concentrating exclusively in the region of the geometrical longitudinal axis 12. In fact the lines of force 46 are pushed outwards as per the realistic illustration in FIG. 2 so that in comparison to other cases in point, the magnetic flux lines run practically uniformly across the bottom face 28, 29. The magnetic flux density is not greatest at the point of contact but rather in the stationary annulus surrounding the blind hole 26 and naturally, further up in the massive core 21.

The most favorable case for setting down the probe is when the gemetrical longitudinal axis stands perpendicular to the surface 42. The apparatus is, however, to a large extent insensitive to position even in such cases where the surface 42 contacts another point of the bottom face 28.

The bottom face 29 may not, however, contact the surface 42, because in this case the old, unfavorable conditions would arise again. On the other hand, if the bottom face 29 were to contact the surface 42, the magnetic reluctance of the entire circuit would be so much lower that this would be easily detected and the measurement recognised as faulty.

Figure 3:
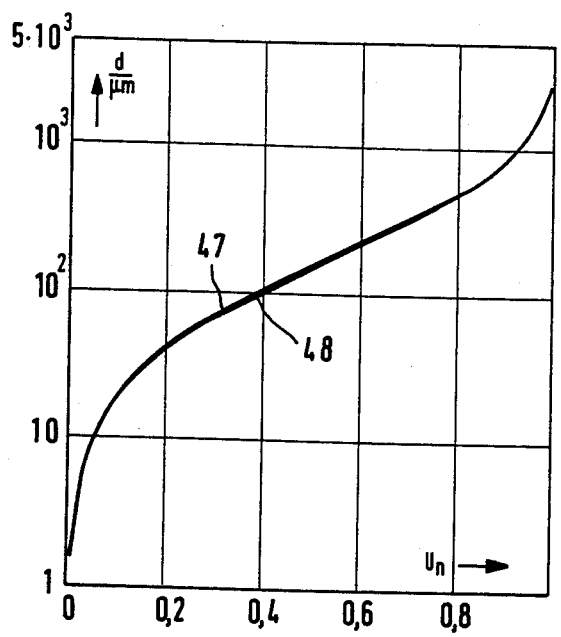
FIG. 3: a characteristic curve of coating thickness versus normalized voltage for two very different materials plotted on a semi-logarithmic scale.

In FIG. 3 the thickness in micrometers is plotted on the logarithmic vertical axis. The normalized voltage $U_n$ is plotted on the linear horizontal axis, whereby $$U_n = (U - U_o)/(U_\infty - U_o)$$

$U_o$ is the voltage generated when the probe is set down on the substrate material 44 and the coating 43 is not present.

$U_\infty$ is the voltage generated when the probe is raised in the air, whereby the distance it is raised is such that the probe is no longer influenced by the magnetic substrate material 44.

U is the voltage which is generated by a measurable coating. Un therefore lies between 0 and 1.

It can be seen from FIG. 3 that only over a particular length does the characteristic curve 47 for hardened steel lie a little above the characteristic curve 48 for soft iron. The deviation is in fact so small that the characteristic curve only appears to be slightly thicker in this region. In the remainder of the range the characteristic curves 47, 48 are identical within the accuracy of the drawing. The similarity over the entire range is extremely favorable.

Figure 4:
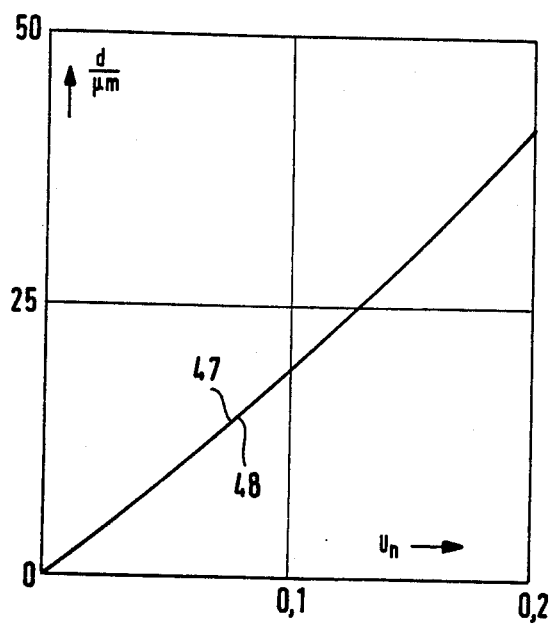
FIG. 4: the lower left hand part of the curve as per FIG. 3, enlarged and plotted with linear coordinates.

FIG. 4 shows the lower left corner of FIG. 3 on a linear scale. As can be confirmed by laying a straight edge on FIG. 4, the non-linear deviation is very slight, and the curves 47 and 48 have joined to become a single line. This means that there is a practically linear relationship between thickness and voltage independent of the substrate to be measured.

In the illustrative embodiment shown in FIGS. 1 and 2 the core 21 had a diameter of 1.6 mm. The radius of the bottom faces 28, 29 was 1.2mm. With this probe values up to 1000 micrometer can be covered—naturally after the measuring ranges have been decided upon—whereby Un can be as high as 0.9.

If the pot core 11 is clad with a foil as per the illustrative embodiment, exciter frequencies of up to 5kHz can be applied to the exciter winding 33. In this manner the design can be still further reduced in size. This allows coatings to be measured in the range 0 to 100 micrometers largely independent of shape, even though, if they are metallic, they cause no noticable eddy-current losses in this range. In this case of the said design the core 21 can have a diameter of 0.8 mm and the pin a diameter of 0.4 mm.

For core probes the inner surface 39 is 1 to 3 times the diameter of the core 21. The length of the pot core 11 lies between 0.5 to 2 times the diameter of the inner surface 39.

Figure 5:
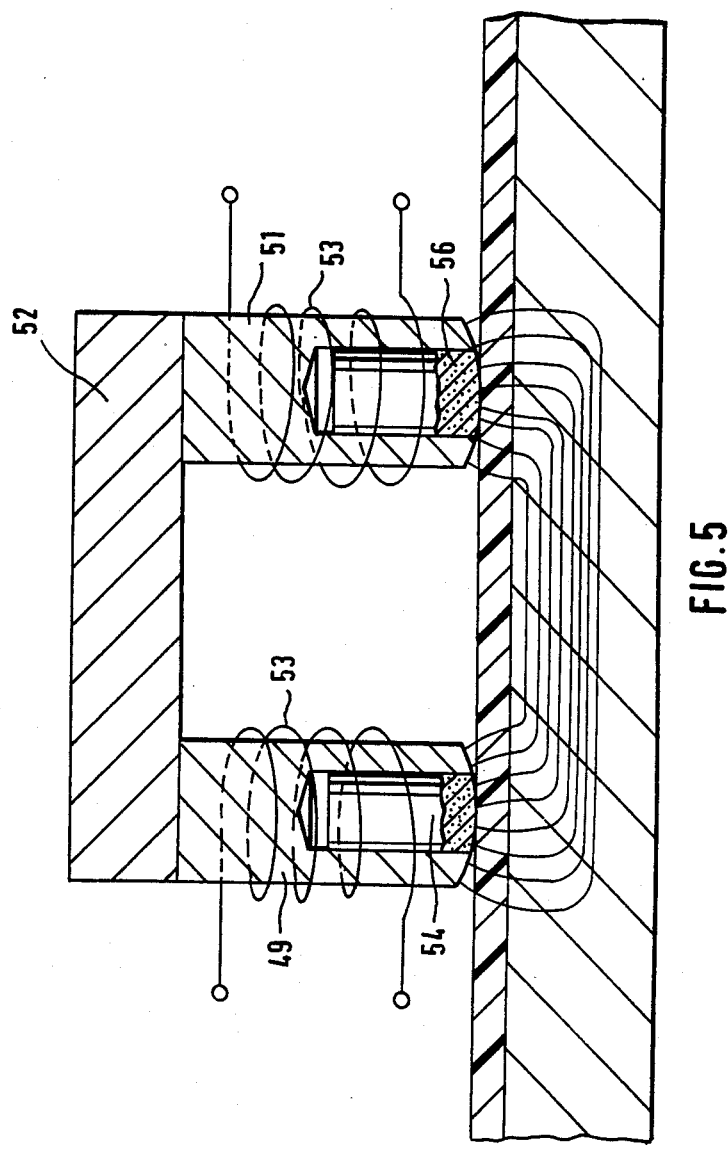
FIG. 5: a cross-section, similar to FIG. 1, but for a two-pole probe.

In the illustrative embodiment of a two-pole probe as per FIG. 5, analogous to the core 21 there are two cores 49, 51. The top faces of these cores are connected together by a yoke 52. The exciter winding 53 is positioned on the core 49 and the induction winding 53 is positioned on the core 51. In this case two the pins 54, 56, analogous to pin 27, have the said geometry.

This type of two-pole probe is advantageous when measurements are to be made on rough surfaces. Since the probabilitiy that both poles are positioned within a hollow or on a hump of the coating are slight, this type of probe averages the measuring effect in a desirable manner.

In addition, two-pole measuring probes have, if the direction lines of force between the two poles can be imagined, an elliptical field, whereby the dependency on shape for measurements on cylindrical materials is much less than is the case for single-pole pot cores, which due to design considerations have a radially symmetric field.

I claim:

1. In an electromagnetic measuring probe for measuring the thickness of coatings, a measuring end comprising:
   at least one pole-piece composed of a magnetic material of high magnetic permeability,
   said pole piece having a pole-piece front face,
   a recess machined into said pole-piece front face and extending into said pole-piece,
   a pin positioned within said recess, and
   a ball-like contact surface at said measuring end for contacting said coatings,
   the improvement wherein:
   said pin is composed of hard metal which has a low magnetic permeability in comparison to the material of said pole-piece, said pin has an external front face which comprises a portion of said ball-like contact surface, and said pole-piece front face surrounding said pin comprises a continuation of said ball-like contact surface, whereby magnetic lines of force at said contact surface are pushed outwards.

2. Probe as claimed in claim 1, wherein said pin is circular cylindrical.

3. Probe as claimed in claim 1, wherein said pole-piece is circular cylindrical.

4. Probe as claimed in claim 1, wherein said pin is composed of sintered hard metal.

5. Probe as claimed in claim 4, wherein said sintered hard metal is titanium carbide with a cobalt content within the range of 2 to 20% by volume.

6. Probe as claimed in claim 4, wherein said sintered hard metal is tungsten carbide with a cobalt content within the range of 2 to 20% by volume.

7. Probe as claimed in claim 1, wherein the dimension of said pin in a direction transverse to the longitudinal axis of said pole-piece is within the range of $\frac{1}{4}$ to $\frac{2}{3}$ of the dimension of said pole-piece.

8. Probe as claimed in claim 1, wherein said pin is several millimeters long and has a diameter within the range of one millimeter or less.

9. Probe as claimed in claim 3, wherein said diameter of said pin is 0.7 mm±50% and of said pole-piece is 1.6 mm±50% in the case of a single-pole.

10. Probe as claimed in claim 1, wherein said ball-like contact surface is a spherical-segment surface, whereby the radius of said spherical-segment is within the range from 0.6 to 3 times the diameter of said pole-piece.

11. Probe as claimed in claim 1, comprising a pot core having a wall with a front face and an inner surface, wherein said pole-piece is positioned centrally in said pot core, said front face of said pole piece stands proud of said front face of said pot core wall, and a foil composed of a material with a high magnetic permeability is clad upon said pot core wall.

12. Probe as claimed in 1, comprising two cores and a yoke arranged to connect said two cores together.

* * * * *